UNITED STATES PATENT OFFICE.

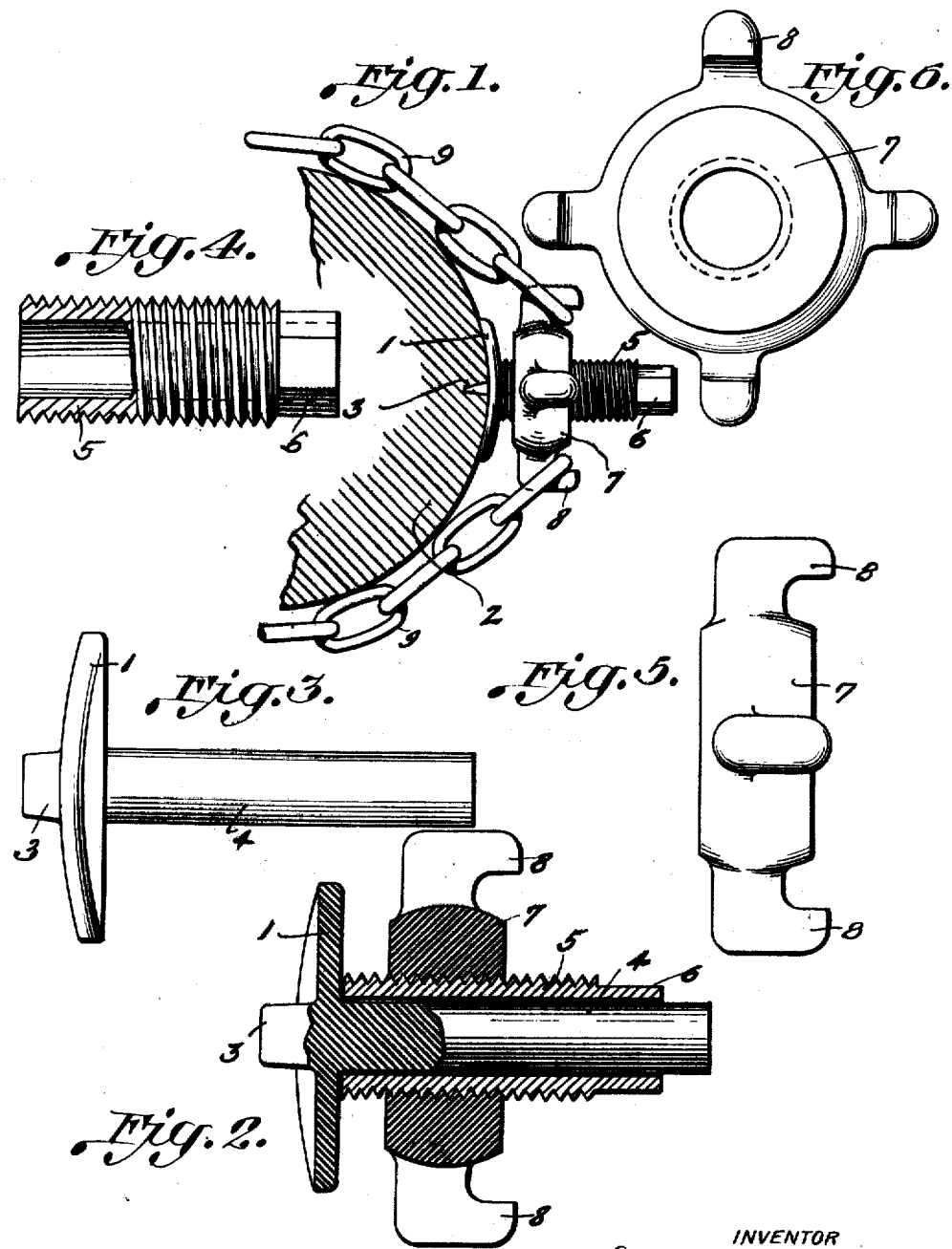

DANIEL PALMER-JONES, OF STOCKWELL, LONDON, ENGLAND, ASSIGNOR OF ONE-HALF TO THE PATENT RAPID SCAFFOLD TIE COMPANY LIMITED, OF STOCKWELL, ENGLAND.

DEVICE FOR CONNECTING TOGETHER MEMBERS SUCH AS SCAFFOLD-POLES AND THE LIKE.

1,300,864.      Specification of Letters Patent.     Patented Apr. 15, 1919.

Application filed August 13, 1918. Serial No. 249,620.

*To all whom it may concern:*

Be it known that I, DANIEL PALMER-JONES, a subject of the King of Great Britain, residing at Stockwell, in the county of London, England, have invented certain new and useful Improvements in Devices for Connecting Together Members Such as Scaffold-Poles and the like, of which the following is a specification.

The present invention refers to improvements in devices such as have already been constructed for connecting together members such as scaffold poles and the like; each of such devices comprised a pressure plate to bear against one of the members to be secured, from which pressure plate a stem rigid therewith extended approximately at right angles therefrom, the stem being screwthreaded to receive a flanged nut, revolubly mounted upon which nut was a plate having hook-like parts or horns hereinafter termed the horn plate upon which horns the ends of a chain could be engaged, which chain was passed around the members to be clamped together, so that by revolving the nut the horn plate would be distanced from the pressure plate and the chain brought into tension to clamp the member.

Such a construction, although essentially successful, yet presented some difficulties of manufacture, among which may be mentioned as examples, that it was necessary to screwthread the stem which was integral with the pressure plate as near as possible to its junction therewith, and it was further necessary to construct the two-part member consisting of the horn plate and the flanged nut, so that they could be held permanently together while permitting the flanged nut to revolve relatively to the horn plate.

Now in such devices it is essential that they should possess considerable strength and not be capable of being easily damaged, while at the same time it is important that the parts composing the device should be few in number and of a simple construction in view of the purposes for which they are employed; and the cost of manufacture is an important factor in rendering such devices capable of general employment, and therefore the object of the present invention is to provide such a construction and one in which the horn plate can be caused to travel along the axis of the stem by the use of a spanner applied to the end of the device and which spanner will not travel along the axis in consonance with the horn plate.

Broadly considered these objects are achieved according to this invention by providing a revoluble sleeve externally screwthreaded and which is slid on to a plain cylindrical stem which is formed integral with the pressure plate, while the horn plate consists simply of a block or disk centrally bored and screw-threaded to engage the thread of the sleeve and formed with horns to engage chains or the like, and thus the revoluble screwed sleeve is supported throughout its length by the stem which is formed with and projects rigidly from the pressure plate. The supporting of the revoluble sleeve throughout its length upon the rigid plain stem is an important factor in the success of the construction according to this invention.

An example of construction of the invention will now be described with reference to the accompanying drawings, whereon Figure 1 shows in sectional plan view, one of the many applications of the invention, in which the device is illustrated engaging the two ends of a chain and tensioning the same by the device taking its bearing and acting against a scaffold pole.

Fig. 2 shows the device drawn to a larger scale and in sectional elevation.

Fig. 3 is an elevation showing the pressure plate and stem detached.

Fig. 4 is a sectional elevation showing the screw threaded sleeve detached.

Fig. 5 is a side elevation, and Fig. 6 is a front elevation, showing the horn plate detached.

In the accompanying drawings the pressure plate 1 is shown of disk formation, and where, as generally it is to be, in face contact with a member to be clamped of cylindrical shape such as the scaffold pole 2 Fig. 1, the said pressure plate is made to conform with such configuration, and on its contacting face the pressure plate 1 is made with a tooth or spur 3, which is adapted to enter the member being clamped.

Proceeding about right angles from and formed integral with the pressure plate is a plain cylindrical stem 4, upon which is slid a sleeve 5, calculated to be freely revoluble upon the stem 4 and having its end bearing on the pressure plate 1 as shown at Fig. 2, and the sleeve 5 is screw-threaded externally and is formed polygonal at its end 6 so that it is adapted to receive a key or other spanner; the end of the stem 4 projects beyond the sleeve 5 to provide means by which said tooth or spur can be driven into one of the members to be clamped.

Screwed upon the sleeve 5 is a block or disk 7 which is formed with a plurality of hook parts or horns 8 around its circumference, to which chains 9 or other flexible connections, see Fig. 1, are to be attached.

In the utilization of such an appliance the pressure plate 1 is placed against the member as at Fig. 1, and the spur 3 is driven into the said member by blows of a hammer on the end of the stem 4, and then the chains 9 or other connections are attached to the horns 8 of the horn plate 7 and a key spanner is applied to the polygonal end 6 of the sleeve, and when the sleeve 5 is formed with a right hand thread it will be observed that by turning the spanner right-handedly the connections 9 will be tensioned to any required degree.

What I claim as my invention and desire to secure by Letters Patent is:—

In devices for connecting together members such as scaffold poles and the like; the combination of a pressure plate having a surface to bear against one of the members to be secured, a plain cylindrical stem extending from the opposite face of said pressure plate and rigid therewith, a sleeve having a plain cylindrical bore to be slid on to said stem and supported thereon throughout its length said sleeve having a screw-thread formed externally thereon a centrally bored and internally screw-threaded block adapted to be screwed on to said sleeve, means on said block for securing thereto the ends of flexible connections passing around the members to be connected together, and means by which said sleeve can be turned about its axis upon said stem to traverse said block in the endwise direction of said sleeve to tension said flexible connections.

In witness whereof I have hereunto set my hand in the presence of two witnesses.

DANIEL PALMER-JONES.

Witnesses:
FRED WM. PICKEN,
SYDNEY STEPHEN LARA.